H. H. BALL.
COUPLING FOR METAL HOSE.
APPLICATION FILED JAN. 21, 1911.
1,044,335.
Patented Nov. 12, 1912.
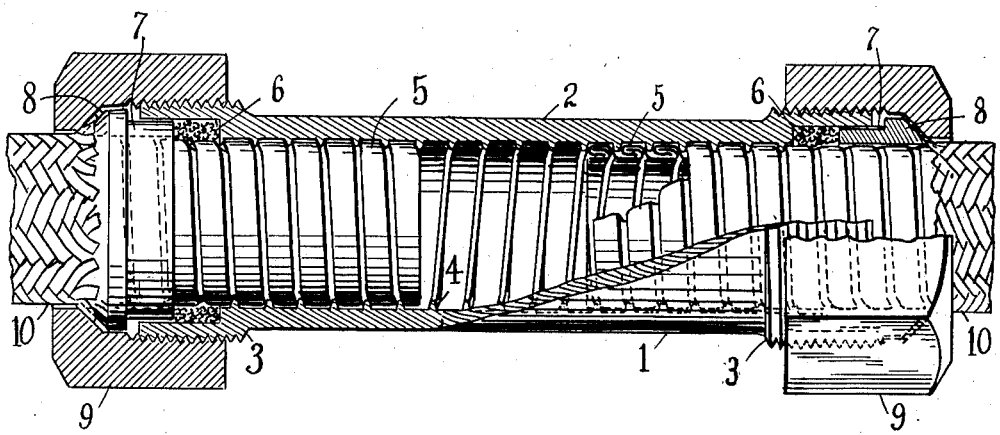
Witnesses:
Samuel W. Balch
Frank C. Cole.
Inventor.
Harold H. Ball
by Thomas Ewing, Jr.
Attorney.

UNITED STATES PATENT OFFICE.

HAROLD H. BALL, OF NEW YORK, N. Y.

COUPLING FOR METAL HOSE.

1,044,335.            Specification of Letters Patent.      Patented Nov. 12, 1912.

Application filed January 21, 1911. Serial No. 603,812.

*To all whom it may concern:*

Be it known that I, HAROLD H. BALL, a citizen of the United States of America, and a resident of the borough of Brooklyn, in the city of New York, county of Kings, and State of New York, have invented certain new and useful Improvements in Couplings for Metal Hose, of which the following is a specification.

The object of this invention is to provide an effective coupling for joining the ends of flexible metal hose and secure the armor with which such hose is surrounded. Hose of the type to which this invention is particularly applicable is formed of a sheet metal helix in which adjoining convolutions are so formed as to lie closely together or lock and form a liquid tight conduit, while the manner of locking is such that a degree of flexibility is permitted. A woven wire armor usually covers the metal helix.

When by reason of hard usage a leak develops in such hose the only practical form of repair consists in cutting out the defective section or severing the hose at about the point of leakage and embedding the ends in a coupling, and the coupling herein set forth is intended chiefly for use in making such repairs.

In the accompanying sheet of drawings which forms a part of this application the figure shows a coupling together with the ends of hose coupled thereby, parts being broken away and shown in section.

The coupling comprises a sleeve 1 which consists of an interiorly threaded middle portion 2 and enlarged end portions 3 3. The middle portion has a thin and widely spaced thread 4 suitably proportioned to engage the spaces between convolutions of the helix 5 which forms the hose.

The enlarged end portions form stuffing boxes in which fibrous packing 6 6 is contained. The packing is compressed by packing glands 7 7 with coned heads 8 8. The enlarged ends of the sleeve are exteriorly threaded and are engaged by interiorly flanged nuts 9 9. The flange of each of the nuts bears against the exterior of the end of the hose armor 10, clamps it against the coned head of the gland and pressing on the gland compresses the packing in the stuffing box against the hose to form a tight joint.

What I claim as new, and desire to secure by Letters Patent of the United States, is—

In a coupling for armored metal hose, the combination with a sleeve interiorly threaded to engage the convolutions forming the body of the hose and having stuffing boxes formed at each end, packing for the stuffing boxes, unthreaded packing glands with coned heads, and interiorly flanged nuts threaded to the sleeve for compressing the packing in the boxes and for engaging the ends of the hose armor between them and the coned heads.

Signed at New York, N. Y., this 20th day of January, 1911.

HAROLD H. BALL.

Witnesses:
    SAMUEL W. BALCH,
    FRANK C. COLE.